United States Patent
Farooqui

(10) Patent No.: US 10,884,736 B1
(45) Date of Patent: Jan. 5, 2021

(54) METHOD AND APPARATUS FOR A LOW ENERGY PROGRAMMABLE VECTOR PROCESSING UNIT FOR NEURAL NETWORKS BACKEND PROCESSING

(71) Applicant: Cadence Design Systems, Inc., San Jose, CA (US)

(72) Inventor: Aamir Alam Farooqui, Elk Grove, CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 16/355,586

(22) Filed: Mar. 15, 2019

(51) Int. Cl.
*G06F 9/30* (2018.01)
*G06F 9/38* (2018.01)

(52) U.S. Cl.
CPC ........ *G06F 9/30036* (2013.01); *G06F 9/3016* (2013.01); *G06F 9/30141* (2013.01); *G06F 9/3887* (2013.01)

(58) Field of Classification Search
CPC .......................... G06F 9/30036; G06F 9/3887
See application file for complete search history.

(56) References Cited

U.S. PATENT DOCUMENTS

2010/0106944 A1* 4/2010 Symes ................ G06F 9/30043
  712/208
2018/0315398 A1* 11/2018 Kaul ........................ G06N 3/08

OTHER PUBLICATIONS

Xtensa Processor Developer's Toolkit—Tensilica Datasheet, Cadence Design Systems, Inc., 2014.
Liu, Yin, and Keshab K. Parhi. "Computing hyperbolic tangent and sigmoid functions using stochastic logic." 2016 50th Asilomar Conference on Signals, Systems and Computers. IEEE, 2016.
"Tensilica Software Development Toolkit (SDK)—Tensilica Datasheet", Cadence Design Systems, Inc., 2014.
Namin, Ashkan Hosseinzadeh, et al. "Efficient hardware implementation of the hyperbolic tangent sigmoid function." 2009 IEEE International Symposium on Circuits and Systems. IEEE, 2009.

(Continued)

*Primary Examiner* — Zachary K Huson
(74) *Attorney, Agent, or Firm* — Vista IP Law Group, LLP

(57) ABSTRACT

An approach is described for a method and apparatus for a low energy programmable vector processing unit for use in processing such as for example neural network backend processing. According to some embodiments, this approach provides a pooling/vector processing unit for performing backend processing that implements a single issue multiple data (SIMD) datapath that performs various backend processing functions using only a single instruction. For instance, the present approach provides an apparatus and method for execution of operations in parallel using a single issued instruction to a plurality of processing cells. In some embodiments, there are multiple groups of processing cells for performing different operations—e.g. pooling, permute, sigmoid/tanh, and element wise operations. In some embodiments, the single instructions are provided by a programmable controller within the pooling/vector processing unit for issuing instructions which manages the retrieval and issuance of instructions within the pooling/vector processing unit.

20 Claims, 12 Drawing Sheets

(56) References Cited

OTHER PUBLICATIONS

Zhang, Ming, Stamatis Vassiliadis, and Jose G. Delgado-Frias. "Sigmoid generators for neural computing using piecewise approximations." IEEE transactions on Computers 45.9 (1996): 1045-1049.
"Tensilica DNA Processor IP for AL Inference", Cadence Design Systems, Inc., 2018.
Desai, Pulin. "Enabling Embedded Vision Neural Network DSPs", 2017.

* cited by examiner

METHOD AND APPARATUS FOR A LOW ENERGY PROGRAMMABLE VECTOR PROCESSING UNIT FOR NEURAL NETWORKS BACKEND PROCESSING

BACKGROUND

The increase of the computing capacity of computing devices and the interconnection of those devices has enabled multiple uses for artificial intelligence. For instance, artificial intelligence can now be found in digital personal assistants and various informational websites. Additionally, artificial intelligence has seen substantial use in image processing fields, such as in recognition of objects (e.g. an AI system in a car recognizing a pedestrian) and other types of image processing.

Various types of techniques have been employed to implement AI and machine learning. For example, one particularly dominant approach to AI is the processing of data using neural networks such as those used in deep learning techniques. Neural networks generally comprise a logical collection of logical nodes connected to other nodes by one or more weighted connections. These logical nodes are arranged in layers logically where each node is associated with the performance of the same type of operations and a plurality of nodes are provided in each layer. For instance, one common type of operation used for convolutional neural networks are multiply accumulate operations. However, while neural networks processing has become dominated by multiply accumulate operations, most AI processes require additional processing (backend processing).

For instance, backend processing currently requires different variations of pooling (max/average, 2×2, 3×3, etc., with different strides), ReLu, ReLu6, Tanh, Sigmoid, and element wise operations on the results generated by the neural networks. Current approaches to performing the pooling, ReLu, ReLu6, Tanh, Sigmoid, and element wise operations are very complex and are generally implemented using algorithms that perform multiple steps on common hardware. As a result of this complexity, current implementations are neither particularly power efficient or particularly fast, requiring numerous reads and writes and many serial operations.

Thus, what is needed is an improved method and apparatus for performing backend operations that is both power efficient and fast.

SUMMARY

Embodiments of the present invention provide an approach for a method and apparatus for a low energy programmable vector processing unit for use in processing such as for example neural network backend processing.

According to some embodiments, this approach provides a pooling/vector processing unit for performing backend processing that implements a single issue multiple data (SIMD) datapath that performs various backend processing functions using only a single instruction. For instance, the present approach provides an apparatus and method for execution of operations in parallel using a single issued instruction to a plurality of processing cells. In some embodiments, there are multiple groups of processing cells for performing different operations—e.g. pooling, permute, sigmoid/tanh, and element wise operations. In some embodiments, the single instructions are provided by a programmable controller within the pooling/vector processing unit for issuing instructions which manages the retrieval and issuance of instructions within the pooling/vector processing unit.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Embodiments of the present invention provide an approach for a method and apparatus for a low energy programmable vector processing unit for neural networks backend processing.

According to some embodiments, this approach includes providing a pooling/vector processing unit for performing backend processing that implements a single issue multiple data (SIMD) datapath. For instance, in on embodiment, a single instruction is used to perform each of a set of pooling operations on a frame, to execute a permutation process on one or a plurality of pairs of inputs, to perform a sigmoid or tanh operation on a plurality of inputs on a plurality of processing cells, and a selection of operations from a multiplication, an additive or subtractive accumulate operation, and a shift operation.

The operation of the pooling/vector processing unit is described below in context of a larger system in regard to at least FIG. 1.

Figure 1:
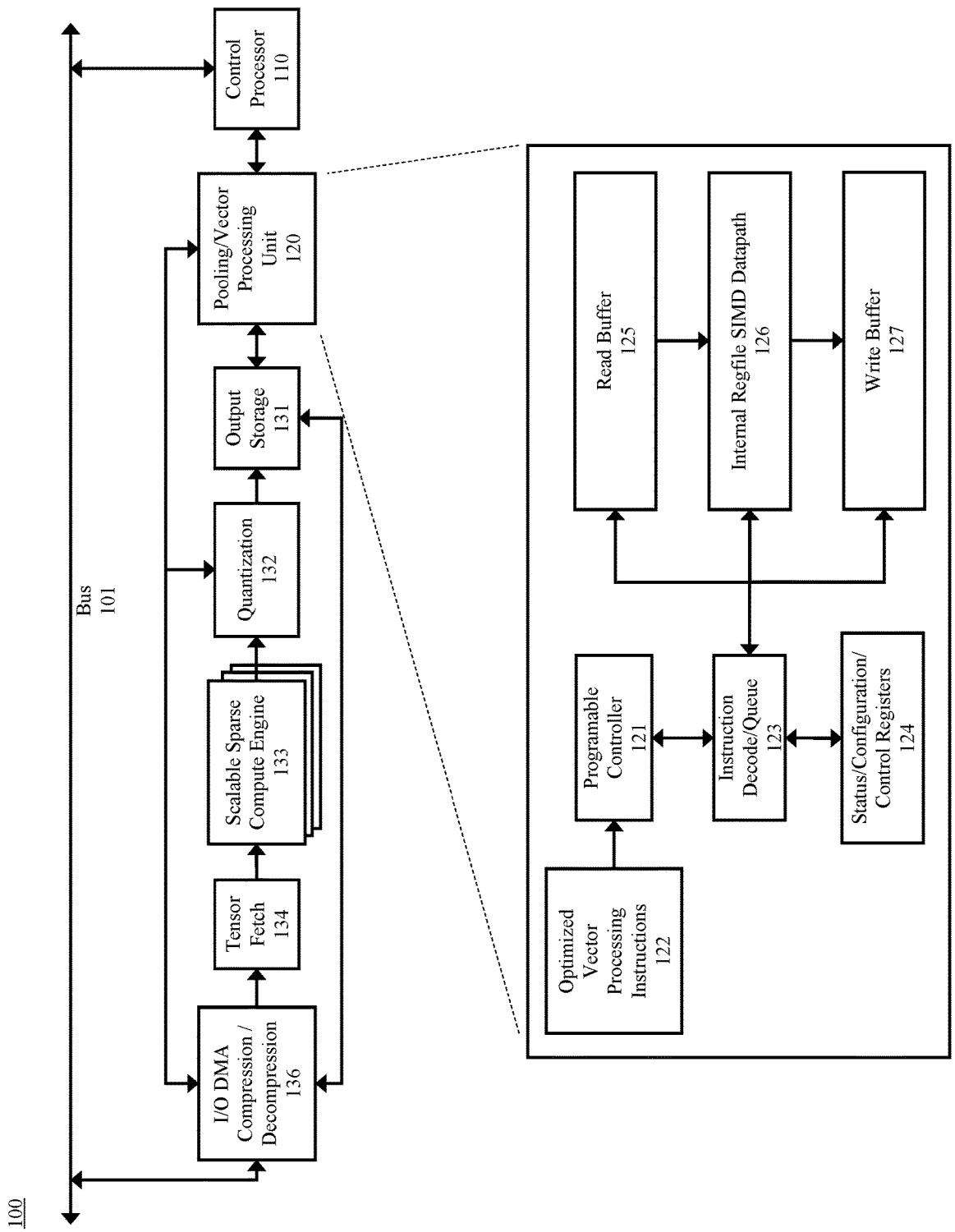
FIG. 1 depicts an example system including a pooling/vector processing unit for low energy programmable vector processing for neural networks backend processing according to some embodiments.

FIG. 1 depicts an example system including a pooling/vector processing unit for low energy programmable vector processing for neural networks backend processing according to some embodiments. Generally, the backend processing is implemented after processing with a neural network. For instance, an image input into a machine learning process as represented by a set of tensors is initially processed using the neural network. Subsequently, various operations are performed on the backend (e.g. after the neural network processing) such as pooling.

The system as illustrated includes multiple components include an I/O DMA (direct memory access) compression decompression module 136, tensor fetch model 134, scalable sparse compute engine 133, quantization module 132, storage element 131, pooling/vector processing unit 120, and a control processor 110. In some embodiments, all of items 110, 120, and 131-136, are included. However, some embodiments include only a subset of items of 110, 120, 131-136, either alone, or in any combination. For instance, the pooling/vector processing unit 120 might receive instructions from a standard central processing unit (CPU) and retrieve data for processing from a memory, either volatile or non-volatile, at an address indicated by the CPU.

The I/O DMA compression/decompression module 136 provides DMA functionality to any of the tensor fetch module 134, the quantization module 132, and the pooling/vector processing unit 120, or some combination thereof. In particular, the I/O DMA compression/decompression module 136 uses one or more busses such as bus 101 or any other connection to a memory such as the connection between the I/O DMA compression/decompression module 136 and the output storage 131 to perform one or a series of fetch operations. For instance, the control processor 110 instructs the I/O DMA compression/decompression module to fetch an image stored as, or convertible to, a set of tensors at an address provided by the control processor 110 and a specified size. The I/O DMA compression/decompression module 110 then retrieves the data corresponding to the image using the specific size to generate one or more fetch/read operations to access a sequential addresses range or multiple sequential address ranges. The tensor fetch module 134 receives the fetched representation of the image from the I/O DMA compression/decompression module 136. In some embodiments, the tensor fetch module 134 includes or is tightly coupled to a volatile storage structure for storing the fetched representation.

The scalable sparse compute engine 133 includes a neural network (e.g. convolutional neural network) for processing received tensors (e.g. from tensor fetch 134 or a corresponding/tightly coupled RAM). Processing in neural networks generally comprises performing one or more operations at multiple nodes of a network of nodes where each node includes a weight—e.g. performing a multiply and accumulate operation at each logical node of multiple logical layers of logical nodes which comprise a network. The output of the scalable sparse compute engine 133 often results in skewed outputs as a result of, at least, the multiplication operations. Thus, in some embodiments, the output of the scalable sparse compute engine 133 can be fed into a quantization module 132 for de-skewing—e.g. by dividing the output of the scalable sparse compute engine 133 by a consistent value. Finally, the output of the quantization module 132 can be stored in an output storage location (e.g. 131) prior to performing backend processing operations.

In some embodiments, the pooling/vector processing unit 120 operates at the direction of the control processor 110. For instance, the control processor sends one or more instructions to control the operation 132-136. Additionally, in some embodiments, the control processor sends one or more instructions to initiate operations at the pooling/vector processing unit 120. For instance, the control processor 110 might send a single instruction to the pooling/vector processing unit 120 to perform a series of pooling operations on the output of a particular processing run of the scalable sparse compute engine 133. These pooling operations serve to condense the data generated by the scalable sparse compute engine 133 or an equivalent. In some embodiments, the pooling/vector processing unit comprises a pooling computation processor. For instance, in some embodiments the pooling/vector processing unit comprises a pooling computation processor that comprises a processor that performs pooling operations—e.g. as disclosed herein.

The pooling/vector processing unit 120 as illustrated includes programmable controller 121, a set of optimized vector processing instructions 122, an instruction decode/queue structure 123, status/configuration/control registers, a read buffer 125, a write buffer 127, and an internal register file SIMD (single issue multiple data) datapath 126. In some embodiments, all the elements illustrated are provided in separate elements/blocks within the pooling/vector processing unit 120. In some embodiments, some of the blocks are combined or provided as part of a single resource. For instance, in some embodiments, the read buffer 125 and the write buffer 127 comprise a single memory structure (e.g. buffer) for storing both newly read data and data to be written at the same or different times. Alternatively, or additionally, the optimized vector processing instructions 122 are provided in a lookup or memory region that is part of or tightly coupled to the programmable controller 121.

In some embodiments, the pooling/vector processing unit 120 receives one or more instructions from the control processor 110. For instance, the pooling/vector processing unit 120 receives the one or more instructions at the programmable controller 121. The programmable controller 121 after receiving the one or more instructions (e.g. c/c++ program instructions) performs one or more lookup operations to retrieve one or more instructions from the collection of optimized vector processing instructions 122. The programmable controller feeds the instructions to the instruction decode/queue 123. The instruction decode/queue 123 issues one or more control signals to implement the processing specified. For example, the instruction decode/queue 123 issues one or more signals to the status/configuration/control registers 124, and/or to the read buffer 125, the write buffer 127, and the internal regfile SIMD datapath 126.

As illustrated, the read buffer 125 includes a storage area for storing data retrieved (e.g. for processing) and providing the data to the internal regfile SIMD datapath 126. Additionally, the write buffer 127 includes a storage area for storing data generated by the internal regfile SIMD datapath (e.g. the results of processing data previously stored in the read buffer 125), and for providing that data to a bus connected to another processing/storage location (e.g. a system memory or the output storage 131).

The internal regfile SIMD datapath 126 and the operation thereof using the optimized vector processing instructions 122 will be discussed further in regard to the subsequent figures. Generally, the processes include receiving/selecting one or more inputs at/from a register file and processing a plurality of inputs in parallel using a single instruction.

In some embodiments, the status/configuration/control registers 124 store various information corresponding to the status of the pooling/vector processing unit 120. For instance, status/configuration/control registers 124 store various status information including any of which instructions are being executed and on what data, the status of any instructions being executed, a cycle count for the current processing, and which may be accessed via one or more instructions to check the status/operation of the pooling/vector processing unit 120.

Figure 2:
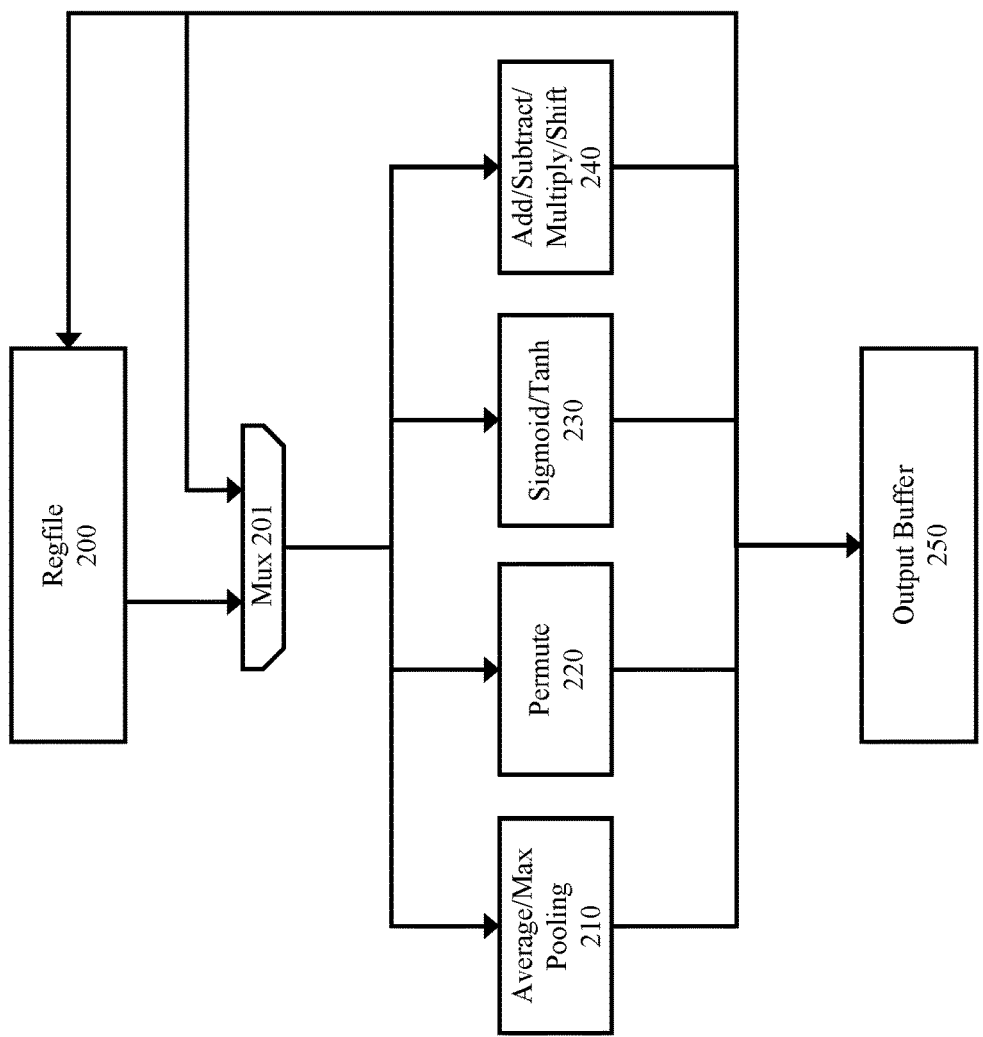
FIG. 2 illustrates an expansion of the internal regfile SIMD datapath illustrated in FIG. 1 according to some embodiments.

FIG. 2 illustrates an expansion of the internal regfile SIMD datapath illustrated in FIG. 1 according to some embodiments. Generally, the internal regfile SIMD datapath includes multiple processing flows for pooling, permutation, sigmoid/tanh, addition, subtraction, multiplication, and/or shift operations.

As illustrated, the internal regfile SIMD datapath 126 includes a register file 200 for holding data values for processing and for holding values after processing. The regfile comprises any one or more of different types of volatile memory such as latches, flip flops, synchronous RAM (random access memory), dynamic RAM or any other type of appropriate memory as is known in the art. For instance, a series of values might be read from the regfile 200 and fed through multiplexer 201, or multiple multiplexers as represented by multiplexer 201, to the permute element 220 where the results are routed back to the regfile for storage. However, in some embodiments, data from the regfile 200 is routed through the multiplexer 201 to a processing element (e.g. average/max pooling 210, permute 220, sigmoid/tanh 230, add/subtract/multiply/shift 240) and then to an output buffer 250 comprising a memory (e.g. a memory in the read buffer 125 or write buffer 127 or a separate volatile memory) or the regfile 200. In some embodiments, the output of a processing element (e.g. average/max pooling 210, permute 220, sigmoid/tanh 230, add/subtract/multiply/shift 240) is routed to the input of a processing element through multiplexer 201 instead of, or in addition to, retrieving values from the regfile 200. While not illustrated, in some embodiments, multiple control signals are generated by the instruction decode/queue 123 in response to the optimized vector processing instructions 122 received from the programmable controller 121. These control signals are used to control the operation and routing of data between the various elements recited herein and to control the SIMD datapath to perform multiple of the same operations in parallel on different data using only a single instruction for each of those operations.

The processing elements (average/max pooling 210, permute 220, sigmoid/tanh 230, add/subtract/multiply/shift 240) are each discussed further below in regard to subsequent figures. For instance, average/max pooling element 210 is discussed below in regard to FIGS. 3A-C, the permute element 220 is discussed below in regard to FIGS. 4A-B, sigmoid/tanh 230 is discussed below in regard to FIGS. 5A-B, add/subtract/multiply/shift 240 is discussed below in regard to FIGS. 6A-B.

Figure 3A:
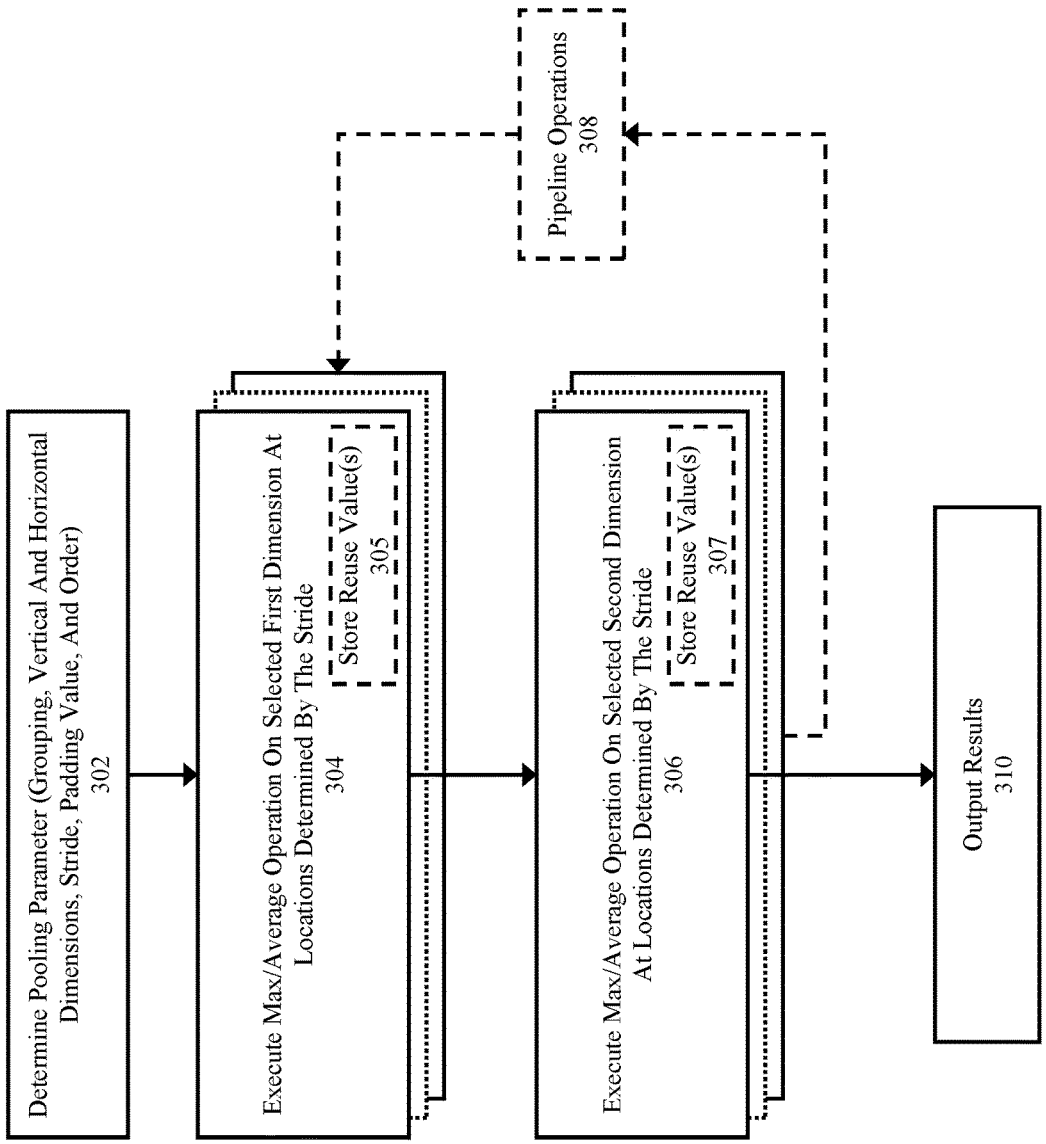
FIG. 3A illustrates a process flow corresponding to the average/max block illustrated in FIG. 2 according to some embodiments.

FIG. 3A illustrates a process flow corresponding to the average/max block illustrated in FIG. 2 according to some embodiments. Generally, the process performs max/average operations over one or more frames of a representation of an image. In some embodiments, the max/average operations serve to condense the data generated by a neural network.

For example, a frame of a given size can be divided into a number of groupings (e.g. pixel groups) based on the size and stride used for identifying those groupings, where the size of the grouping is the type of grouping. For instance, a frame that is 8×8 with a grouping of 2×2 and a stride of 1 has 64 groupings. Each of these groupings could be processed serially using a traditional processor. However, this is inefficient as it requires multiple read and write operations, transpose operations, and many cycles. In contrast, the present invention provides a register file that can be populated with multiple values of the frame, and subsequently, using a single instruction, at least some of the multiple values can be read from the register file into the multiple processing cells of the average/max pooling 210 apparatus. Each of the processing cells thereof can then perform the same operation on the multiple different data values. For instance, the 8×8 frame with a grouping of 2×2 and a stride of 1 has only 64 groups. Each group requires 2 average or max operations in the first dimension and 1 in the second dimension. Thus, with 64 processing cells only 2 cycles are required to perform all of the average or max operations for the frame and only 1 cycle for each of the 64 processing cells is required to perform all of the average/max operations for the frame. In contrast, a purely serial processor would require 192 cycles to complete the same processing.

At 302, a determination is made with regard to pooling parameters. For instance, any combination of vertical/horizontal dimensions, stride, padding values, and ordering of processing is determined for a particular frame. For example, a process is determined to have a group size (e.g. 2×2), a frame size (e.g. vertical dimensions of (8) and horizontal dimension of (8)), a stride (e.g. 1), all padding sizes being equal to some value X (e.g. zero or one), and a vertical then horizontal processing flow.

At 304, a max or average operation is performed on the selected dimension at a plurality of locations within each grouping of the frame for multiple groups as determined by the stride. For instance, a 2×2 grouping comprises four values arranged in a square configuration. A frame having a size of 8×8 plus padding with a stride of 1 would have 8 groupings along the horizontal dimension and 8 groupings along the vertical dimension—8*8 groupings. Thus, if the average/max pooling 210 comprises 16 processing cells, then in a first cycle each of 8 groupings in a first dimension can be processed in a selected dimension for each value along that dimension within each grouping. In a second cycle, the remaining dimension can be processed by only 8 of the processing cells. As a result, the two cycle process outputs the result of a 2×2 grouping for 8 groupings in only two cycles. This is in contrast to prior techniques, that utilize standard processing units (e.g. CPUs), which required two additional write operations (e.g. writing the result of the average or max operation on the first dimension), at least a transpose operation prior to performing the average/max operation on the second dimension, and which serialize processing instead of using a SIMD arrangement.

In some embodiments, the results of the max or average operations can be stored in corresponding reuse registers included in or otherwise associated with a respective processing cell of the processing cells. For instance, if the grouping size is larger than 2×2, e.g. 3×3, reuse registers can be used to store the results of a first max or average operation to avoid generating an additional write and read operation (see store reuse value(s) 305). For example, when there are 3 values in each dimension, an operation of only two of those values would require an additional processing step. Here, to avoid generating additional write/read operations, the reuse register for each corresponding processing cell can be used to store the result of processing of two values of the group. Subsequently, in a second cycle or in a cascaded operands arrangement, the same or a second processing cell can use the results of the average or max operation stored in the reuse register to perform an average or max operation on the value in the reuse register and the remaining operand. Finally, each processing cell or pair of processing cells, can be used to perform the same operation. Thus, a 3×3 grouping would require 3 average or max operations in a first cycle, and 3 average or max operations in a second cycle to generate a 1×3 or 3×1 grouping. Therefore, an arrangement of 30 processing cells could process 10 groupings in only 2 cycles in a first phase. This will be discussed further in regard FIG. 3C below.

In some embodiments, the max or average operations can be performed on 4×4 groupings. For example, a first processing cell processes a first two values in the first dimension, and a second processing cell processes a second two values in that same dimension. Each of the processing cells store the results of the processing in a corresponding reuse register, and the two values in the corresponding reuse registers are subsequently used by a processing cell to perform an average or max operation with respect to the two values stored in the corresponding reuse registers. Thus, a 4×4 grouping requires 12 processing steps to complete. For instance, in a first cycle the 4×4 grouping is reduced to a 2×4 or 4×2 grouping using 8 processing cells, and in a second cycle the 2×4 or 4×2 grouping is reduced to a 1×4 or 4×1 grouping respectively using 4 processing cells.

At 306, the max or average operations are performed on the second dimension on the results of the processing on the first dimension at locations corresponding to each grouping in the frame. For instance, the result of processing a 2×2 grouping comprises two values logically adjacent to each other (e.g. 1×2 or 2×1). Here, each processing cell can process the two values to determine the average or max value. In the case of a larger grouping, multiple cycles or multiple processing cells may be required to perform the average/max operations. For example, a 3×3 grouping would be reduced in the first processing step (see 304 above) to either 1×3 or 3×1. Regardless of the whether the input is 1×3 or 3×1, the average max operation will take 2 processing steps. For instance, a first processing step to process two values, and a second processing step to process the third/remaining variable and the result of processing the two values. In some embodiments, the 4×4 dimension processed in a first step for the first dimension is reduced to 1×4 or 4×1. The second processing step reduces the 1×4 or 4×1 to only a single value by first performing, in a first cycle, an average or max operation on a first two values and a second two values using two processing cells, and where each processing cell stores the results in a corresponding reuse register (see store reuse value(s) 307). In a second cycle, a processing cell uses the two values stored in the corresponding reuse registers to perform the average or max operation.

At 310, the results of the described flow are output. For instance, the results might be output to the register file for further processing. In some embodiments, the results are output to a write buffer (e.g. write buffer 127). However, in some embodiments, multiple cycles at 304 and 306 may be required. For instance, where the number of average or max operations is greater than the number of processing cells for the first stage (see 304 above) or the second stage (see 306 above) then a pipeline operation(s) may be required (see 308). For instance, a 2×2 grouping with a stride of 1 on a 32×32 frame would require 64 average or max operations to generate the complete results for each row/column in the first dimension and 32 average or max operations to generate the output of the second dimension. Furthermore, to process all groupings in the same flow would require 64*32 processing cells (2048). Thus, in some embodiments, each frame may be divided in subframes, or may be processed in a pipelined manner. For instance, a row, partial row, or subset of the frame may be processed in each of a series of pipelined operations. In some embodiments, the grouping sized might comprise differing sized in different dimensions (e.g. 2×3, 2×4, etc.).

Figure 3B:
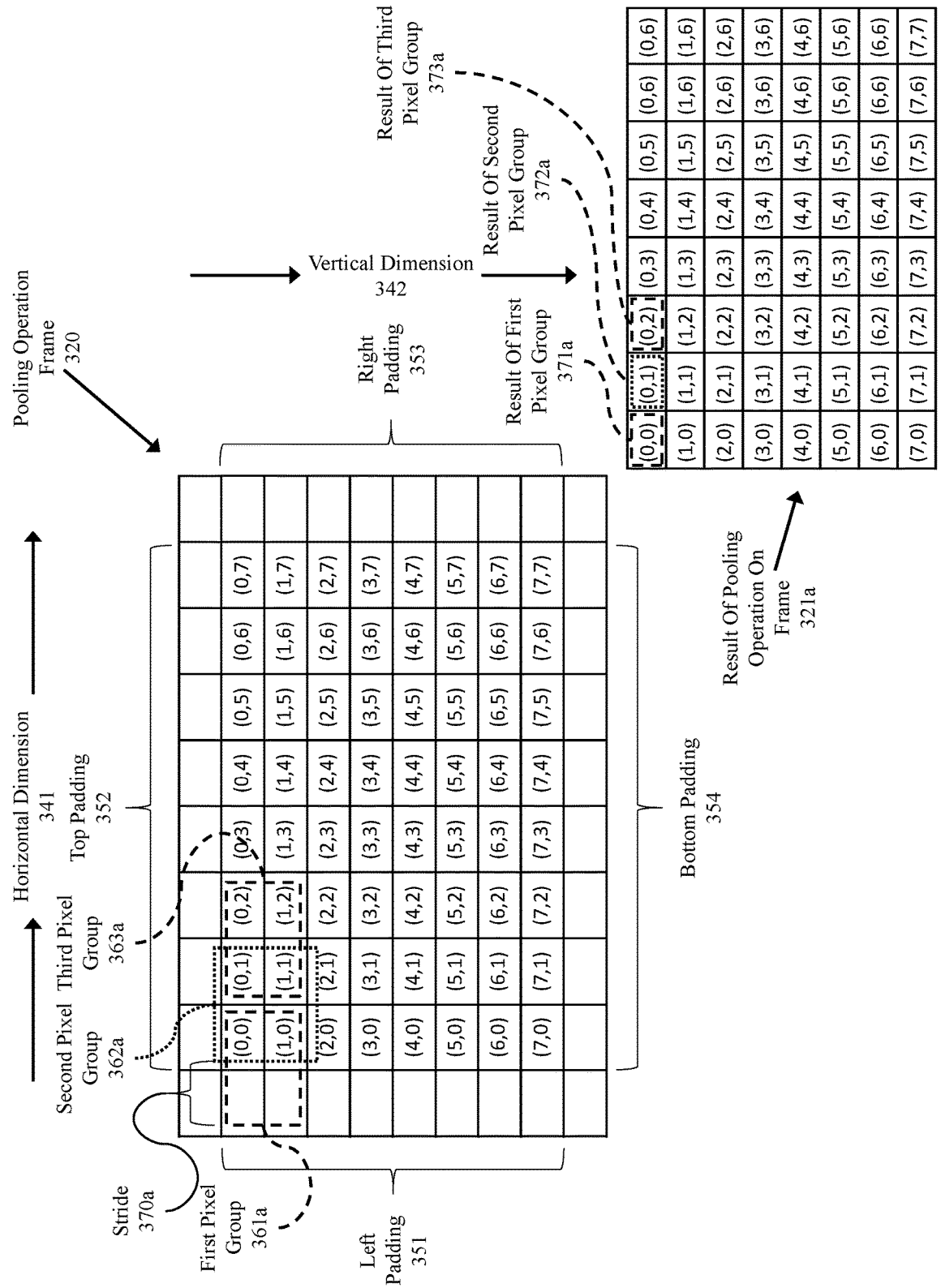
FIG. 3B-C provide illustrative examples of pooling operations on a frame according to some embodiments.
Figure 3C:
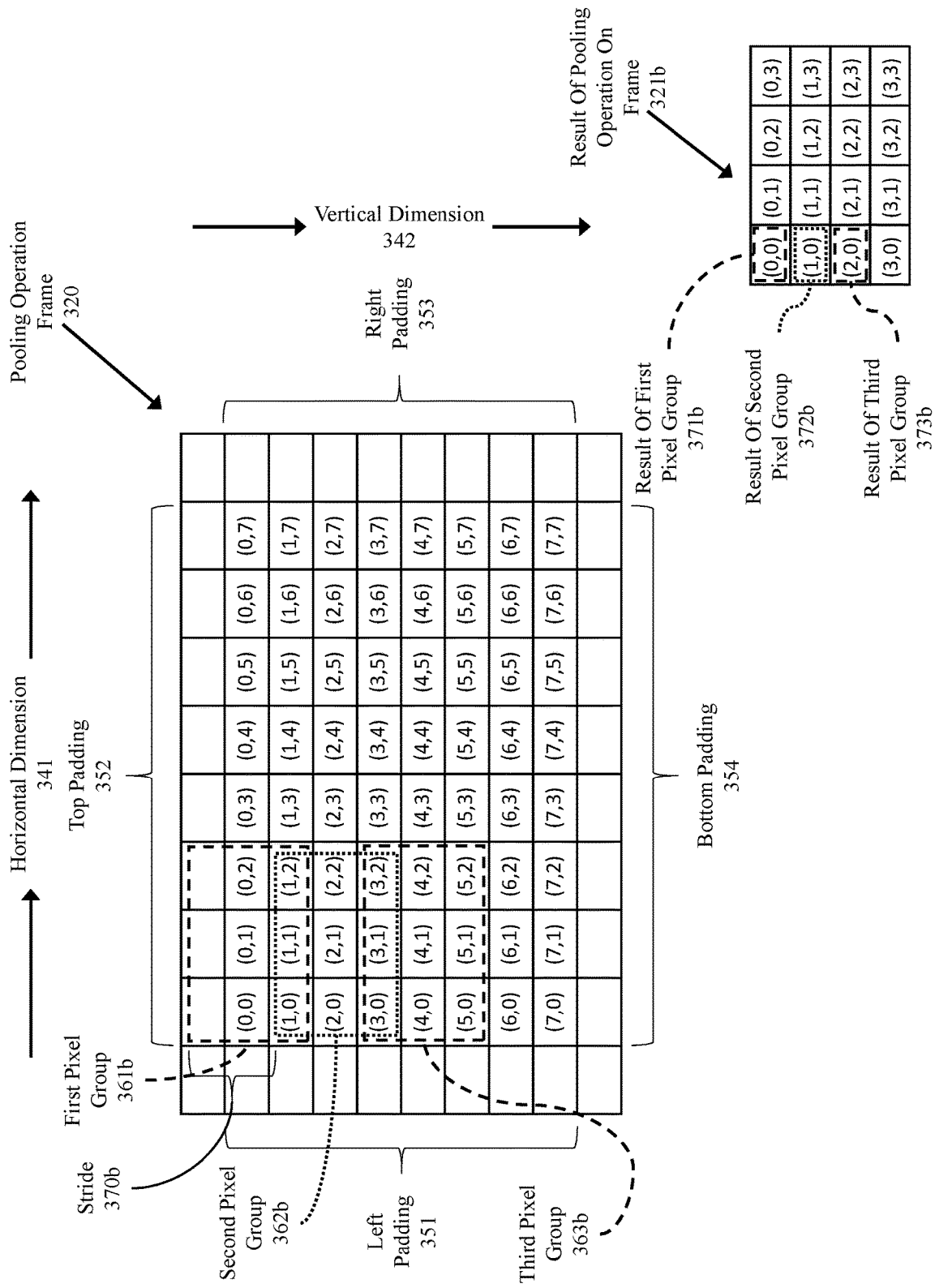

FIG. 3B-C provide illustrative examples of pooling operations on a frame according to some embodiments.

FIG. 3B illustrates a frame (320) having a size of 8×8, a horizontal dimension (341), and vertical dimension (342). Within the frame, three pixel groups are illustrated (361a, 362a, 363a) having sizes of 2×2, and be located at locations determined by the stride of 1 (370a).

This figure illustrates a few of the aspects previously discussed. First, the figure illustrates the frame 320 having a size of 8×8 where the frame can be thought of as representative of at least a portion of an image, where each cell (see e.g. (0,0)) within the frame represents the value of a pixel or group of pixels that may have already been processed or pooled at least once.

Additionally, each frame will be associated with one or more padding values. For instance, as illustrated the frame is associated with a left padding value at 351, a right padding value at 353, a top padding value at 352, and a bottom padding value at 354. In some embodiments, two or more of the padding values (351-354) are different. In some embodiments, the padding values (351-354) are all equal within a single frame but not necessarily equal from one frame to another frame. In some embodiments, the padding value(s) is dependent on the particular technique being used in the backend processing or scalable sparse compute engine 133.

As previously discussed, each group within the frame is reduced to one value using a max or average operation on the values in the group in a first dimension (e.g. horizontal) and then a second dimension (e.g. vertical). Additionally, each frame may also be processed in a first dimension and then a second dimension with respect to the pixel groups. For instance, as illustrated here, the first pixel group 361a includes 2 padding values and the values at locations (0,0) and (1,0). The second pixel group 362a includes the values at locations (0,0), (0,1), (1,0), and (1,1). The third pixel group 363a includes the values at locations (0,1), (0,2), (1,1), and (1,2). Thus, the three pixel groups are arranged in the horizontal dimension (a first dimension). The processing illustrated here could be completed along a horizontal dimension, and then moving one position down (as determined based on the stride) and processing the next set of values in the first dimension before moving down another position and repeating the process until all the values of the frame have been processed. In another embodiment, the first dimension (e.g. horizontal dimension) and the second dimension could be limited to a subset of the frame at a time. For instance, the 8×8 frame could be divided into four 4×4 frames and where processing is performed for each 4×4 frame.

Regardless of the order of the processing of the groups the output in this example comprises an 8×8 frame (321a). The reason that the output frame is 8×8 is because with a stride of 1 and a size of the frame plus the padding will be decreased by 1. Thus, the output here is 8×8 because the size of the frame with padding is 9×9. The output at (0,0) (see results of pooling operation on frame 321a) correspond to both values in the frame, and the padding value for the frame. Additionally, each of the 2×2 groups (see 361a, 362a, 363a) correspond to singular outputs at the output 321a (see pixel group results 371a, 372a, 373a).

FIG. 3C illustrates the same frame (320) from FIG. 3B having the size of 8×8, a horizontal dimension (341), and vertical dimension (342). Within the frame, three pixel groups are illustrated (361b, 362b, 363b) having sizes of 3×3, and be located at locations determined by the stride of 2 (370*b*). As with FIG. 3B the frame also includes padding values 351-354.

As illustrated here, the first pixel group 361*b* includes 3 padding values and the values at locations (0,0) through (1,2). The second pixel group 362*b* includes the values at locations (1,0) through (2,2). The third pixel group 363*a* includes the values at locations (3,0) through (1,2). Here, the three pixel groups are arranged in the vertical dimension (a first dimension). Similar to the previous example, the processing illustrated here could be completed along a vertical dimension first, and then moving two positions over in the horizontal dimension (as determined based on the stride) before processing the next set of values in the current first dimension. In another embodiment, the first dimension (e.g. vertical dimension) and the second dimension could be limited to a subset of the frame at a time. For instance, the 8×8 frame could be divided into four 4×4 frames and where processing is performed for each 4×4 frame separately.

Regardless of the order of the processing of the groups the output in this example comprises an 8×8 frame. The reason that the frame is 4×4 is because a stride of 2 reduces the size of the frame by 2 in each dimension and a grouping of size 3×3 reduces the size of the frame by 2. The output at (0,0) (see results of pooling operation on frame 321*b*) correspond to both values in the frame, and the padding value for the frame. Additionally, each of the 3×3 groups (see 361*b*, 362*b*, 363*b*) correspond to singular outputs at the output 321*b* (see pixel group results 371*b*, 372*b*, 373*b*).

Figure 4A:
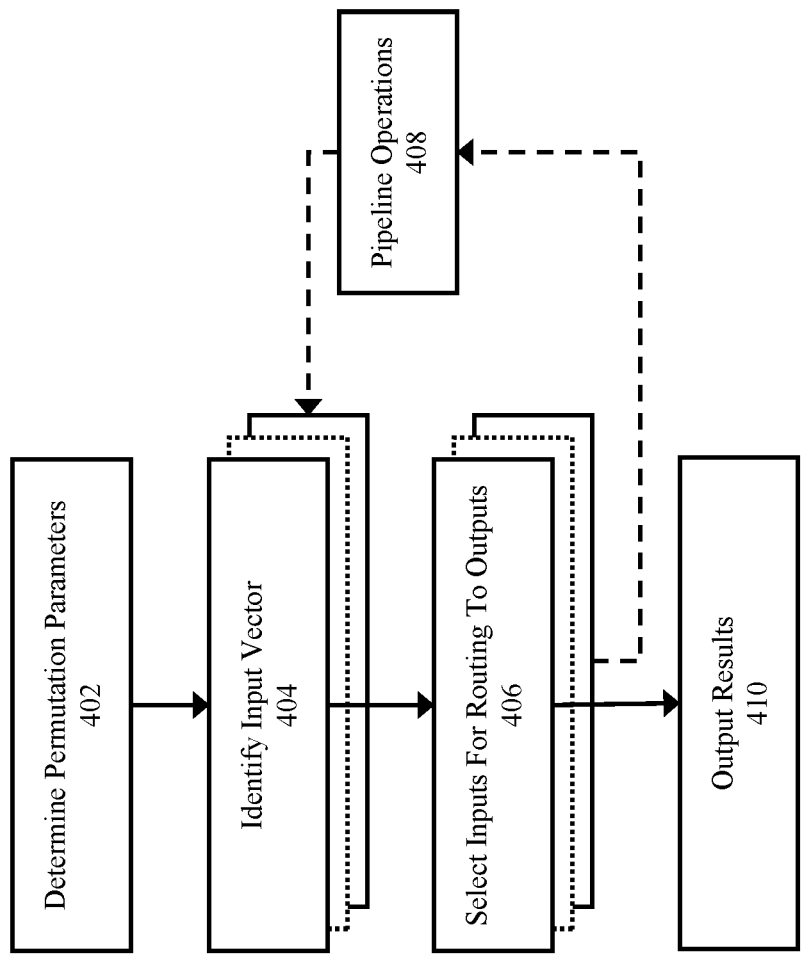
FIG. 4A illustrates a process flow corresponding to the permute block illustrated in FIG. 2 according to some embodiments.

FIG. 4A illustrates a process flow corresponding to the permute block illustrated in FIG. 2 according to some embodiments. Generally, the permutation block accepts two different series of inputs and outputs one of a number of possible arrangements of those inputs at the output. In some embodiments, permute operations are performed to for preparation to execute a multiplication process that operates on that are larger then the width of a single processing cell. In some embodiments, the permute operations are performed to prepare/order data for output from the pooling/vector processing unit.

The process starts at 402, where permutations parameters are identified. For example, permutation parameters might comprise a value indicating whether to select a first input or a second input for all or a portion of the output. Another parameter might comprise a specification of the arrangement of parameters (e.g. a mode). At 404, the process starts by identifying an input vector at each of a plurality of processing cells. For instance, an input vector might be identified from a number of inputs (e.g. selected from regfile 200 and/or multiplexer 201 such as from the output of a previous computation). In some embodiments, the inputs are specified by the permutation parameters determined in 402. In some embodiments, the permutation parameters are identified from a permutation vector that specifies a mode and the inputs to the permutation operations.

Figure 4B:
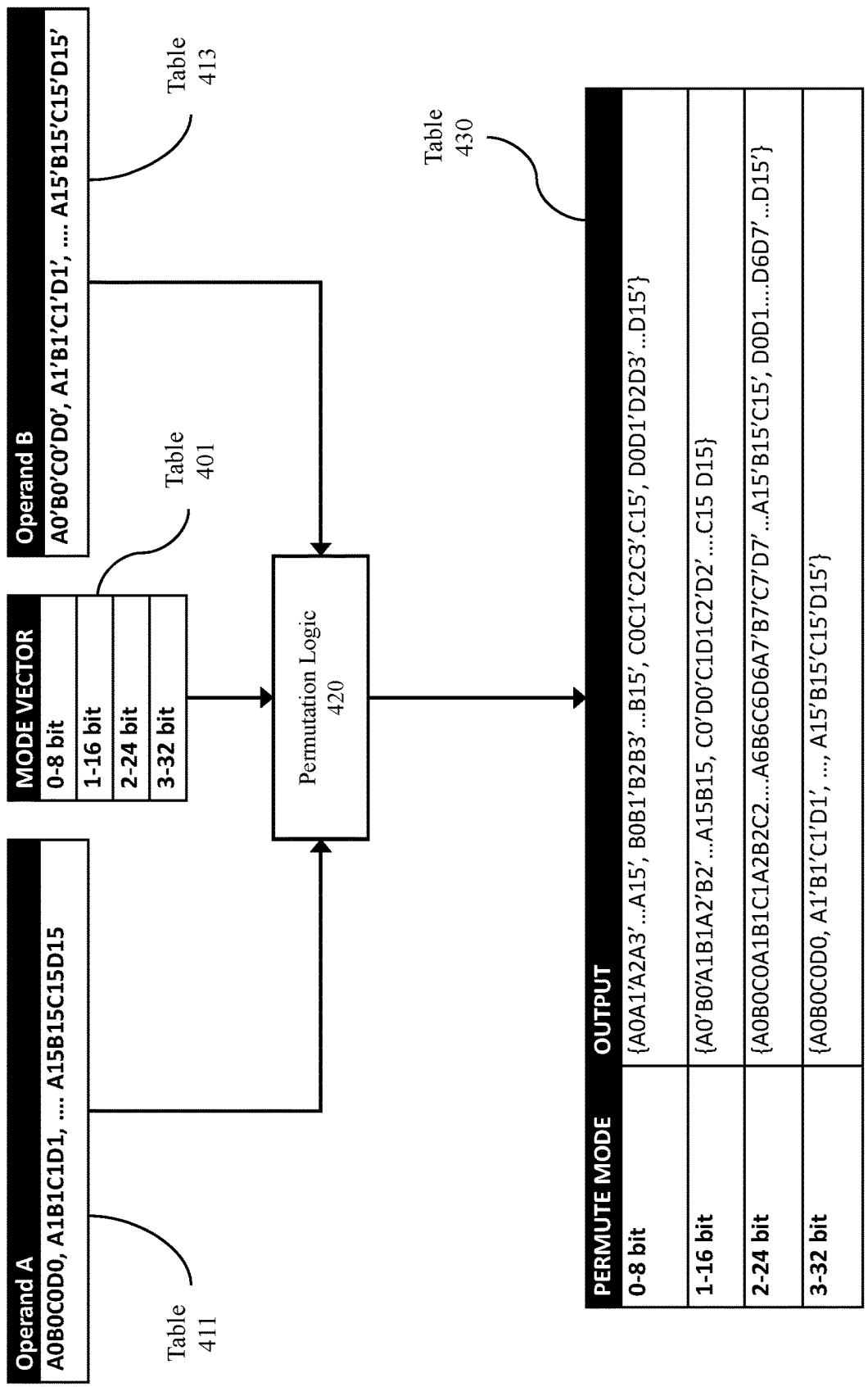
FIG. 4B provides an illustrative example of a permute operation according to some embodiments.

At 406 a selection of inputs, or subsets thereof, is made to route the selected inputs to the output at each of the processing cells. For instance, in one embodiment, the selection is performed using one or more control signals that control how the input vectors are connected to the output of the processing cells of the permutation element 220 when a corresponding set of control signals are provided. FIG. 4B below provides examples of different arrangements as will be discussed below.

In some embodiments, the multiple input vector pairs can be processed in parallel using a single instruction. For instance, using multiple processing cells within the permute element 220 each having two independent inputs and independent outputs for receiving and outputting vectors and internal logic for performing the selection and arrangement (e.g. the arrangement of multiplexers). Furthermore, in some embodiments, the operations of the permute element 220 or cells thereof can be operated in a pipelining process at 408 to perform multiple permutations.

At 410, the output(s) of the permutation operation(s) is provided. For example, the outputs of the permutation operations might be stored in a register file (e.g. regfile 200), an output buffer (e.g. output buffer 250), a read buffer 125 (e.g. to retain data for a future operation) or a write buffer 127 (e.g. to store the data for output to a non-volatile storage).

FIG. 4B provides an illustrative example of a permute operation according to some embodiments. The figure includes 3 inputs to a permutation logic element and one output that can take different forms depending on the mode.

For example, at table 411 operand A is illustrated. Operand A and comprises a series of values provided in a specific arrangement. Specifically, operand A comprises an ordered arrangement of values in a series of subgroups, where each subgroup comprises a corresponding value from each of different parameter sets. For instance, as illustrated table 411 includes the set of parameters identified as A0-A15, B0-B15, C0-C15, D0-D15. Each of these parameters are also provided in a specific order. Here, the order is $A_iB_iC_iD_i$ where "i" identifies the corresponding value in the sets of parameters (e.g. A0B0C0D0, A1B1C1D1, . . . A15B15C15D15). Table 413 provides a similar illustration but instead of A0-A15, B0-B15, C0-C15, D0-D15 table 413 illustrates that the values of operand B are different using prime notation for corresponding values using the same ABCD notation (e.g. A0'B0'C0'D0', A1'B1'C1'D1', A15'B15'C15'D15').

Table 401 and 413 provide a representation of four possible modes supported by the permutation logic 420 (e.g. a processing cell of the permutation element 220). For instance, one possible mode is the 0-8-bit mode, where the output comprises four groups, where each group corresponds to only one set of parameters. For example, if each set of parameters comprises an A/A' series, a BB' series, a C/C' series, and a D/D' series, an output might comprise a first grouping comprising A0A1'A2A3' . . . A15', a second grouping comprising B0B1'B2B3' . . . B15', a third grouping comprising C0C1'C2C3'.C15', and a fourth grouping comprising D0D1'D2D3' . . . D15'. In some embodiments, each value comprises 8 bits, and the output of the 0-8-bit mode comprises 4 outputs of 128 bits.

Table 401 and 413 illustrate a 1-16-bit mode, where each the parameter sets are intermingled in groups of two. For instance, in the 1-16-bit mode, the A and B sets are grouped together, and the C and D sets are grouped together to form two 256-bit outputs. For instance, one output of the 1-16-bit mode might comprise {A0'B0'A1B1A2'B2' . . . A15B15, C0'D0'C1D1C2'D2' . . . C15 D15}.

Table 401 and 413 illustrate a 2-24-bit mode, where each of the parameter sets are intermingled in a group of three (to the extent possible). For instance, in the 2-24-bit mode, the A, B, and C sets are grouped together, and the D set is a group on its own to form a 384-bit output and a 128-bit output. For instance, one output of the 2-24-bit mode might comprise {A0B0C0A1B1C1A2B2C2 . . . A6B6C6D6A7'B7'C7'D7' . . . A15'B15'C15', D0D1 . . . D6D7' . . . D15'}.

Table 401 and 413 illustrate a 3-32-bit mode, where each of the parameter sets are intermingled in groups of four. For instance, in the 3-32-bit mode, the A, B, C, and D sets are grouped together into 16 words of 32 bits. For instance, one output of the 3-32-bit mode might comprise {A0B0C0D0, A1'B1'C1'D1', A15'B15'C15'D15'}.

In some embodiments, each corresponding input may be selected from either the operand A or the Operand B inputs base on an input vector. For instance, for each "i" of the corresponding $A_i$, $B_i$, $C_i$, and $D_i$ where "i" identifies the corresponding value in the sets of parameters, the operand A inputs or the operand B inputs might be selected. In some embodiments, all inputs are selected from either operand A or operand B. In some embodiments, all even numbers are selected from operand A and all odd numbers are selected from operand B or vise versa. In some embodiments, a first half of the values are selected from operand A and a second half of the values are selected from operand B or vise versa. In some embodiments, the input operand for each of the "i" values can be separately specified using a control vector.

Figure 5A:
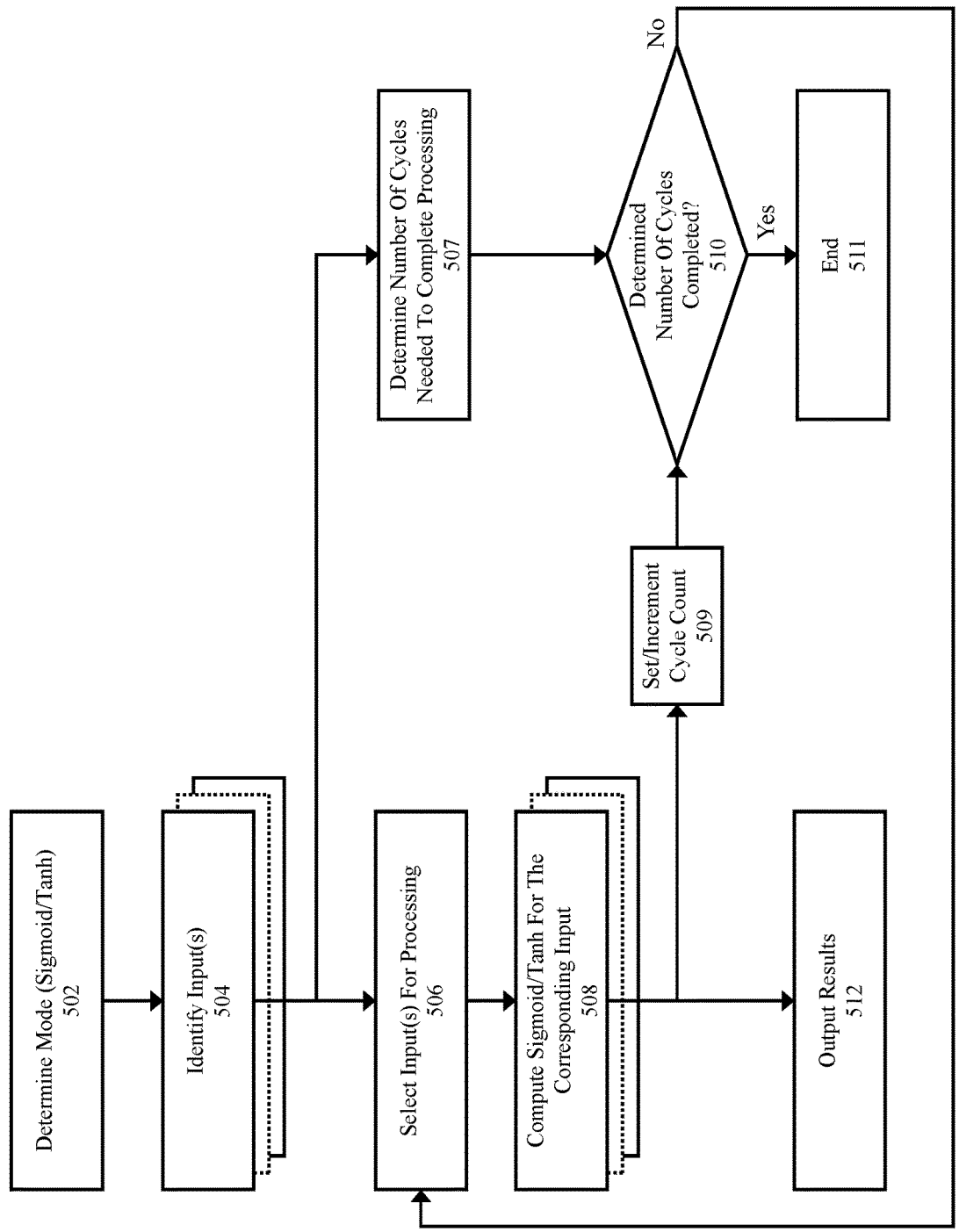
FIG. 5A illustrates a process flow corresponding to the sigmoid/tanh block illustrated in FIG. 2 according to some embodiments.

FIG. 5A illustrates a process flow corresponding to the sigmoid/tanh block illustrated in FIG. 2 according to some embodiments. In general, this process comprises a determination of which operation is to be performed, which input the operations are to be performed on, and a determination of the results of the determined operation all using a single instruction. In some embodiments, to sigmoid/tanh block performs soft max operations such as part of a ReLu or ReLu6 operations, or generally as part of centroid type operations.

At 502, a determination is made as to whether the sigmoid/tanh element 230 is operating in a sigmoid mode or a tanh mode. At 504, the inputs upon which the selected operation, as determined by the mode at 502, is to be executed upon are identified. For example, the inputs might be selected from the regfile 200, from the output buffer 250, or from the output of another element via multiplexer 201. At 506 the input(s) identified at 504, or a subset thereof, are selected for processing. For instance, if the sigmoid/tanh element 230 includes 32 single instruction multiple data cells then, 32 input(s) of the input(s) identified at 504 are selected.

At 508, each of the selected inputs (see 506) are processed to compute the sigmoid or tanh of the corresponding input depending on the mode. For instance, each of 32 processing cells within the sigmoid/tanh element 230 processes a single input to determine a single output using a sigmoid or tanh operation in parallel using a single instruction and shared control signals to the processing cells.

At 512, the output(s) of the sigmoid or tanh operations are provided. For example, the outputs of the sigmoid or tanh operations might be stored in a register file (e.g. regfile 200), an output buffer (e.g. output buffer 250), a read buffer 125 (e.g. to retain data for a future operation) or a write buffer 127 (e.g. to store the data for output to a non-volatile storage).

In some embodiments, at 506 a determination is made as to the number of cycles needed to complete processing at 507. For instance, the number of inputs identified at 504 is divided by the number of processing cells within the sigmoid/tanh element 230. At 509, a cycle count is set on the completion of a first cycle or incremented on completion of any other cycle. At 510, the determined number of cycles from 507 is compared to the cycle count from 509 to evaluate whether the number of cycles needed have been completed. If the number of cycles needed have been completed, then the process ends at 511. However, if the number of cycles needed has not yet been completed the process returns to 506, and subsequently 508-510, 512, which are all repeated until the evaluation at 510 results in the determined number of cycles being completed and the process ending at 511.

Figure 5B:
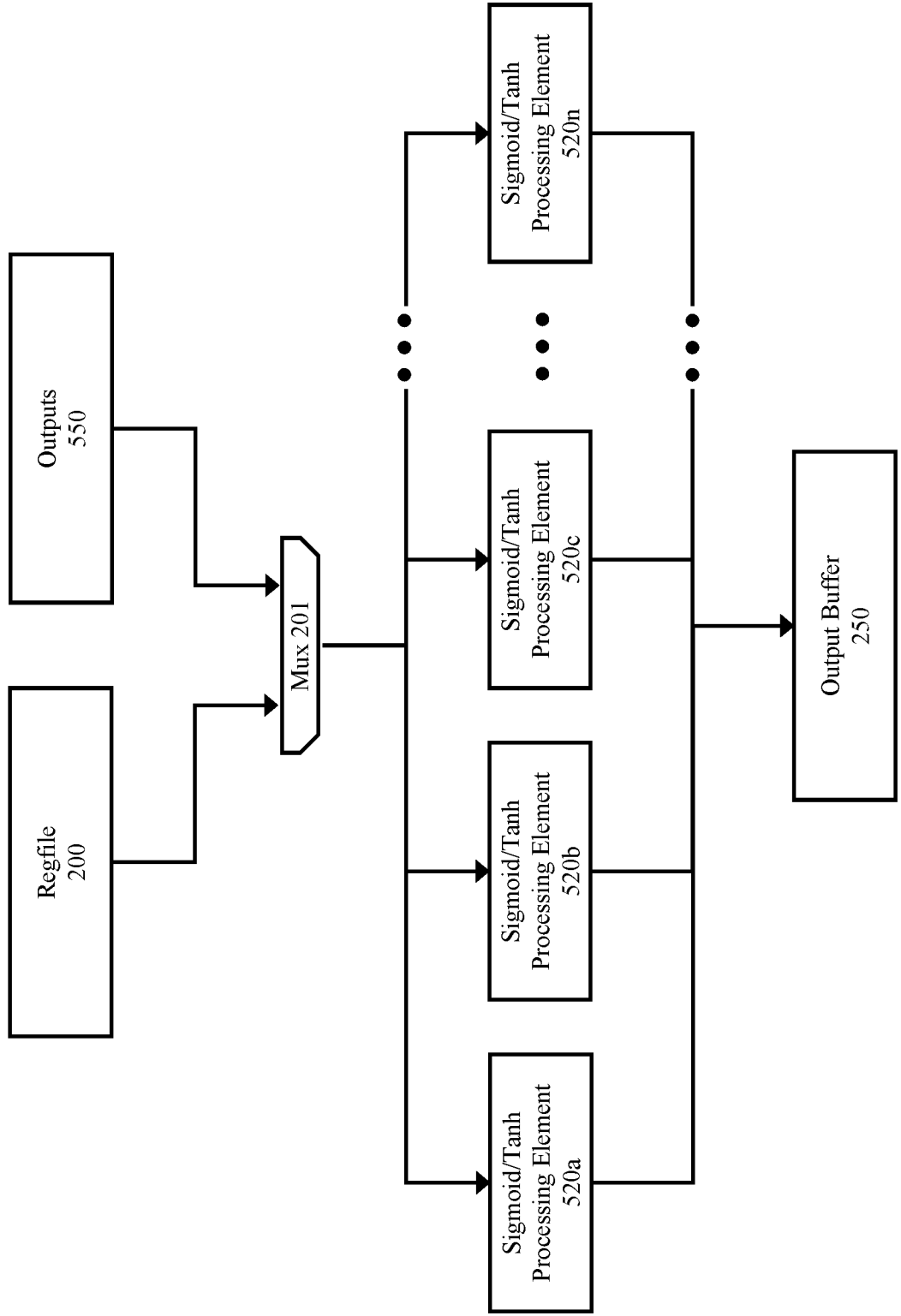
FIG. 5B provides an illustrative example of an apparatus for executing sigmoid/tanh operations using a SIMD process according to some embodiments.

FIG. 5B provides an illustrative example of an apparatus for executing sigmoid/tanh operations using a SIMD process according to some embodiments. Generally, the apparatus includes multiple processing cells for execution of the same operation on different inputs in parallel using a single instruction.

In some embodiments, the inputs can be selected from either the Regfile 200 or outputs 550 from a previous operation from any of the average/max pooling element 210, the permute element 220, or the add/subtract/multiply/shift element 240. For instance, the inputs might be selected by routing specified inputs to respective processing cells with the apparatus via one or more multiplexers as exemplified by multiplexer 201 which may be the same multiplexer(s) illustrated in FIG. 2.

The inputs are processed by respective cells within the apparatus (e.g. 520a-n) which each provide a selectable sigmoid/tanh processing function on a received input. For example, single instruction might be provided to all or a subset of the sigmoid/tanh processing cells 520a-n to perform either the sigmoid or the tanh operation on the received input as represented by one or more of the same control signals sent to multiple sigmoid/tanh processing cells.

Subsequently, the output(s) of the sigmoid or tanh operation(s) are provided by the multiple sigmoid/tanh processing cells. For example, the outputs of the sigmoid or tanh operation(s) might be stored in a register file (e.g. regfile 200), an output buffer (e.g. output buffer 250 illustrated), a read buffer 125 (e.g. to retain data for a future operation) or a write buffer 127 (e.g. to store the data for output to a non-volatile storage).

Figure 6A:
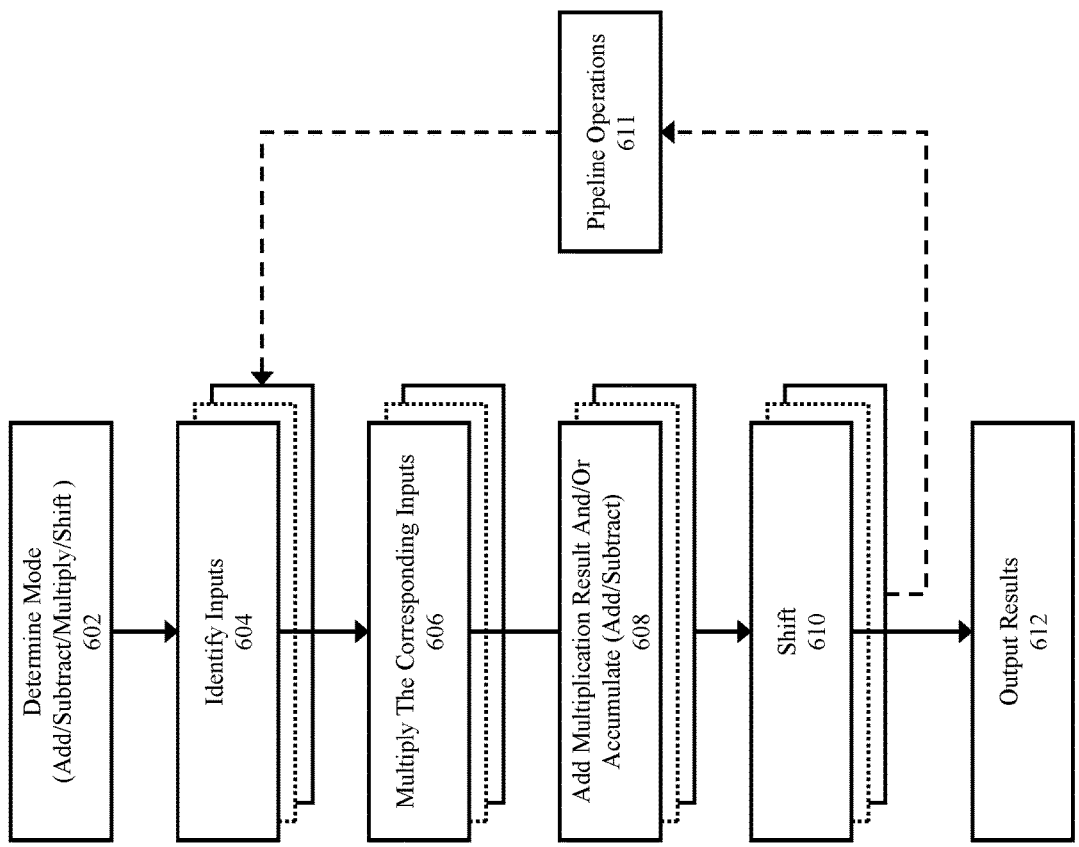
FIG. 6A illustrates a process flow corresponding to the add/subtract/multiply/shift block illustrated in FIG. 2 according to some embodiments.

FIG. 6A illustrates a process flow corresponding to the add/subtract/multiply/shift block illustrated in FIG. 2 according to some embodiments. Generally, the process includes multiple stages where different operations may be performed by each of a plurality of processing cells. In some embodiments, the add/subtract/multiply/shift block performs element wise operations, such as element wise operations on two different frames to combine those frames into a single frame (e.g. multiplying different values by constants and adding them together).

At 602 an operation mode is determined. The operation mode may include any of a multiplication, an add or subtract accumulation operation, and a shift operation. For instance, a typical operation might comprise a multiply and additive accumulation operation, followed by a shift operation.

At 604, each one or two inputs are identified for each of a plurality of processing cells. For instance, in some embodiments, an A input and a B input might be identified. In some embodiments, only one input is identified, and the second input is set to a default value (e.g. 1). At 606, the corresponding inputs (e.g. an A and a B input of each processing cell) are multiplied. In some embodiments, the results of the operation are provided in a carry and save arrangement.

At 608, an add or subtract accumulate operation might be completed. For example, a result of a previous multiplication operation is added to the result of the current multiplication. This result may be further processed at 610 using a shift operation. For instance, the result of multiplying two 8-bit numbers results in a 16-bit number, so a shift operation might be completed to fit the result to an 8-bit value.

At 612, the output(s) of the add/subtract/multiply/shift operations are provided. For example, the outputs of the add/subtract/multiply/shift operations might be stored in a register file (e.g. regfile 200), an output buffer (e.g. output buffer 250), a read buffer 125 (e.g. to retain data for a future operation) or a write buffer 127 (e.g. to store the data for output to a non-volatile storage).

At 611, a pipeline operation might be performed in order to perform additional add/subtract/multiply/shift operations. For instance, if the number of multiply operations exceeds the number of corresponding processing cells, then a pipeline operation might be utilized to process additional add/subtract/multiply/shift operations.

Figure 6B:
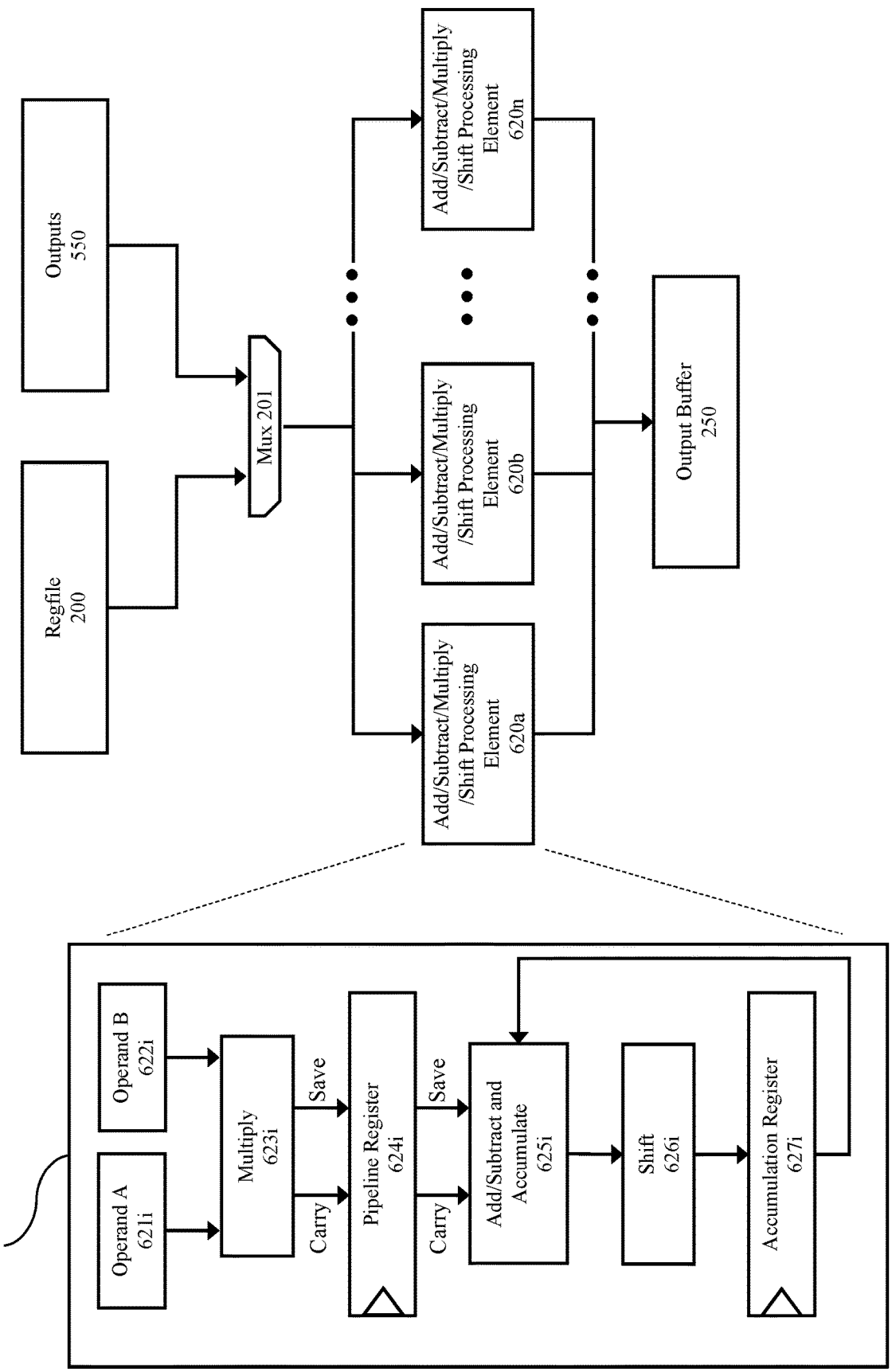
FIG. 6B provides an illustrative example of an apparatus for executing add/subtract/multiply/shift operations using a SIMD process according to some embodiments.

FIG. 6B provides an illustrative example of an apparatus for executing add/subtract/multiply/shift operations using a SIMD process according to some embodiments. Generally, the apparatus includes multiple processing cells for execution of the same operation(s) on different inputs in parallel.

In some embodiments, the inputs can be selected from either the Regfile 200 or outputs 550 from a previous operation from any of the average/max pooling element 210, the permute element 220, the sigmoid/tanh element 230, or previous add/subtract/multiply/shift operations via the accumulation register 627a. For instance, the inputs might be selected by routing specified inputs to respective processing cells with the apparatus via one or more multiplexers as exemplified by multiplexer 201 which may be the same multiplexer(s) illustrated in FIG. 2.

In some embodiments, the inputs are processed by respective cells within the apparatus (e.g. 620a-n) which each provide a selectable set of operations that can be completed comprising multiplication, an add or subtract accumulation operation, and/or a shift operation. For example, two inputs might be provided to each cell for each cell to perform multiply, accumulate (additive), and shift operations.

Block 620 illustrates an expanded view of the internals of each of the add/subtract/multiply/shift processing cells 620a-n according to some embodiments. For instance, an operand A input (621i) and an operand B input (622i) are provided to a multiplication unit 623a that outputs a carry and a save value to a pipeline register 624i. The pipeline register 624i outputs the stored carry and save values to the add/subtract and accumulate unit 625i which also receives an input from accumulation register 627i which may have previously received and stored an output from a shift block 626i.

The output(s) of the add/subtract/multiply/shift operations operation(s) are provided by the add/subtract/multiply/shift operations processing cells. For example, the outputs of the add/subtract/multiply/shift operation(s) might be stored in a register file (e.g. regfile 200), an output buffer (e.g. output buffer 250 illustrated), a read buffer 125 (e.g. to retain data for a future operation) or a write buffer 127 (e.g. to store the data for output to a non-volatile storage).

System Architecture Overview

Figure 7:
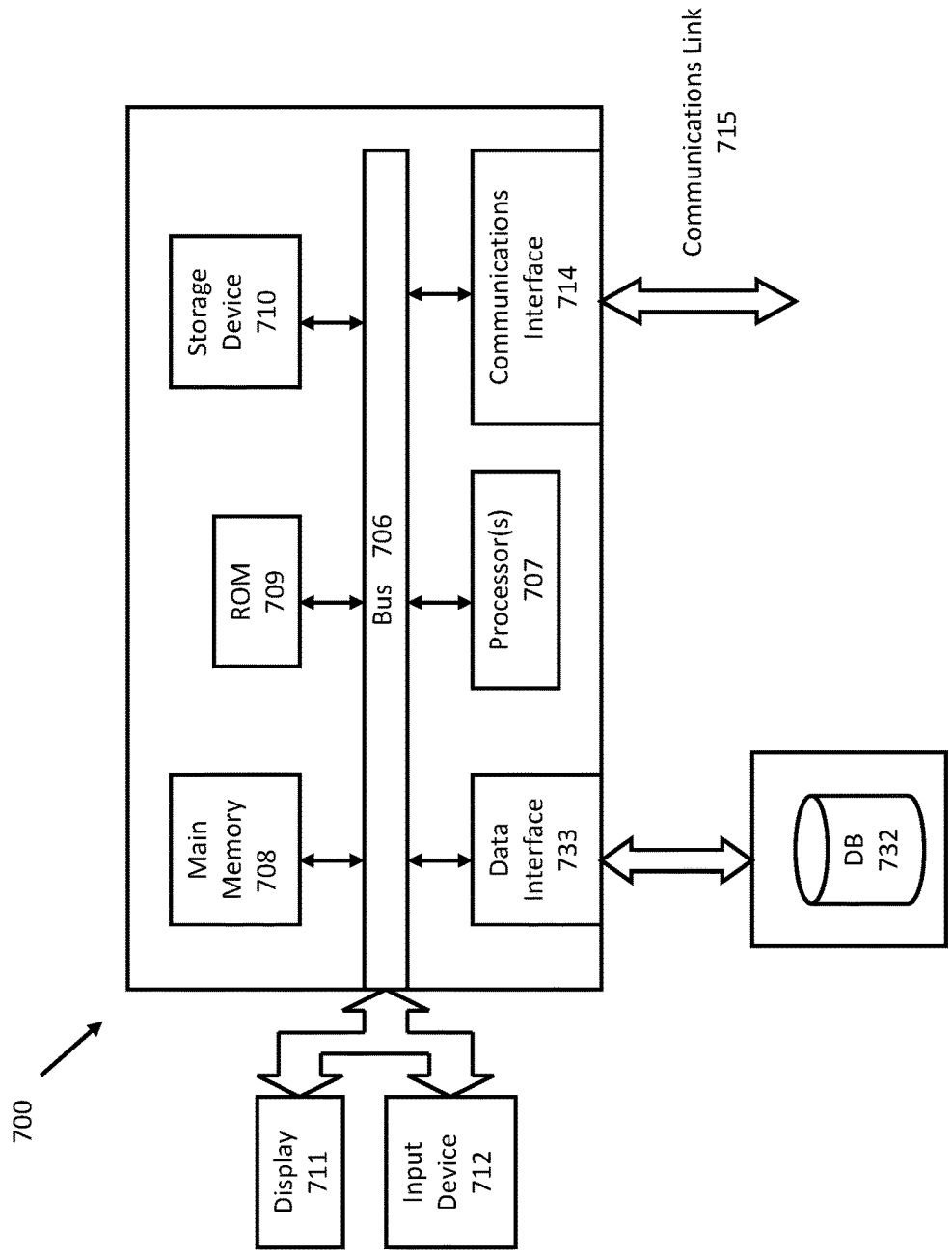
FIG. 7 shows an architecture of an example computing system with which the invention may be implemented.

FIG. 7 shows an architecture of an example computing system with which the invention may be coupled or implemented in part. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. Computer system 700 may communicate through a data interface 733 to a database 732 on an external storage device 731.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. An apparatus, comprising:
a programmable controller coupled to a storage element having vector processing instructions, the programmable controller being coupled to a processor for receiving an instruction from the processor that specifies a function to be performed;
an instruction decoder coupled to the programmable controller to receive a vector processing instruction from the programmable controller for implementing the function; and
a single issue multiple data (SIMD) datapath coupled to the instruction decoder for executing the vector processing instruction by receiving control signals corresponding to the vector processing instruction to perform the function.

2. The apparatus of claim 1, further comprising a register file coupled to the SIMD datapath.

3. The apparatus of claim 1, further comprising a read buffer and a write buffer, or a combined read and write buffer coupled to the SIMD datapath.

4. The apparatus of claim 1, wherein the SIMD datapath comprises at least one of an average or max pooling processing element, a permute element, a sigmoid or tanh element, and an element wise add or subtract, multiply, and shift element.

5. The apparatus of claim 1, wherein the SIMD datapath comprises an average or max pooling processing element that implements a pooling function of a specified type on a frame using a single vector processing instruction issued by the instruction decoder and a plurality of processing cells operating in parallel.

6. The apparatus of claim 5, wherein the average or max pooling processing element has a configurable stride, padding, and order of processing.

7. The apparatus of claim 5, where the plurality of processing cells are associated with a plurality of reuse registers, and wherein the plurality of reuse registers store one or more values generated by at least some of the plurality of processing cells.

8. The apparatus of claim 1, wherein the SIMD datapath comprises an permute element that implements permutation function on pairs of inputs using a single vector processing instruction issued by the instruction decoder and a plurality of cells operating in parallel.

9. The apparatus of claim 1, wherein the SIMD datapath comprises sigmoid or tanh element that implements a sigmoid or tanh function on a plurality of respective inputs using a single vector processing instruction issued by the instruction decoder and a plurality of cells operating in parallel.

10. The apparatus of claim 1, wherein the SIMD datapath comprises an element wise add or subtract, multiply, and shift processing element for selectably performing multiplication, additive or subtractive accumulation, and shift operations on a plurality of respective input pairs using a single vector processing instruction issued by the instruction decoder and a plurality of processing cells operating in parallel.

11. A method, comprising:
receiving, at a programmable controller, an instruction from a processor that specifies a function to be performed;
identifying, at a programmable controller, a vector processing instruction of vector processing instructions in a storage element coupled to the programmable controller, wherein execution of the vector processing instruction implements the function;
receiving, at an instruction decoder, the vector processing instruction from the programmable controller; and
executing the vector processing instruction using control signals corresponding to the vector processing instruction to perform the function, wherein execution utilizes a single issue multiple data (SIMD) datapath coupled to the instruction decoder.

12. The method of claim 11, wherein the SIMD datapath is coupled to a register file.

13. The method of claim 11, wherein a read buffer and a write buffer, or a combined read and write buffer is coupled to the SIMD datapath.

14. The method of claim 11, wherein the SIMD datapath performs at least one of an average or max pooling function, a permute function, a sigmoid or tanh function, and an element wise add or subtract, multiply, and shift function.

15. The method of claim 11, wherein the SIMD datapath comprises an average or max pooling processing element that implements a pooling function of a specified type on a frame using a single vector processing instruction issued by the instruction decoder and a plurality of processing cells operating in parallel.

16. The method of claim 15, wherein the average or max pooling processing element has a configurable stride, padding, and order of processing.

17. The method of claim 15, where the plurality of processing cells are associated with a plurality of reuse registers, and wherein the plurality of reuse registers store one or more values generated by at least some of the plurality of processing cells.

18. The method of claim 11, wherein the SIMD datapath comprises an permute element that implements permutation function on pairs of inputs using a single vector processing instruction issued by the instruction decoder and a plurality of cells operating in parallel.

19. The method of claim 11, wherein the SIMD datapath comprises sigmoid or tanh element that implements a sigmoid or tanh function on a plurality of respective inputs using a single vector processing instruction issued by the instruction decoder and a plurality of cells operating in parallel.

20. The method of claim 11, wherein the SIMD datapath comprises an element wise add or subtract, multiply, and shift processing element for selectably performing multiplication, additive or subtractive accumulation, and shift operations on a plurality of respective input pairs using a single vector processing instruction issued by the instruction decoder and a plurality of processing cells operating in parallel.

* * * * *